Nov. 29, 1966  J. ROTWEIN ET AL  3,287,839
IDENTIFICATION CARD PROVIDED WITH COMBINATION LOCKING MEANS
Filed March 24, 1965  2 Sheets-Sheet 1

INVENTORS
Joseph Rotwein &
Andrew E. Friedrich

BY Thomas, Neidman & Russell
ATTORNEYS

United States Patent Office 3,287,839
Patented Nov. 29, 1966

3,287,839
IDENTIFICATION CARD PROVIDED WITH
COMBINATION LOCKING MEANS
Joseph Rotwein, 1500 Massachusetts Ave. NW., Bethesda,
Md., and Andrew E. Friedrich, Laurel, Md.; said
Friedrich assignor to said Rotwein
Filed Mar. 24, 1965, Ser. No. 442,446
4 Claims. (Cl. 40—2.2)

The present invention relates broadly to a credit card device, and more specifically, to a credit card having a combination lock incorporated therein which must be unlocked before the card can be rendered valid. In other words, our invention is concerned with a means for validating or invalidating such a card, which means is solely within the control of the owner of the card.

The cards ordinarily carried on one's person generally relate to such aspects as identification, a license of some sort, membership in an organization, security clearance, credit, etc. When lost by the owner these are very often practically irreplaceable, or if replaceable, replaced only with some inconvenience and difficulty. Again, when such cards are lost or stolen, and fall into the hands of persons who might appropriate them to their own use, they may readily be used by the one in possession, often without arousing the slightest suspicion. With respect to the instant invention, however, this difficulty is readily obviated. When lost, the finder, not being able to validate the card, cannot use it for its intended purpose.

The advantage of the invention over known card devices is thus quite evident: in the former case it is only necessary that the holder of a conventional credit card present it, and without more, the person to whom it is presented is then obliged to extend credit, in some form, to the owner whose name appears thereon. Credit cards, and the like, are usually lost or stolen together with other similar cards, such as licenses found in one's wallet or purse. When this happens, the finder or thief, as it were, may better and more convincingly identify himself without resorting to a forged identification or other subterfuge. Thus, in such instances, any possessor of the conventional credit card can use it to charge goods and services to the true owner thereof without really too much difficulty.

An innocent holder or thief coming into possession of the card, which forms the present invention, would be completely unable to make use of the card. To effect such a safeguard, and as a requisite to the use of our new and improved card, a combination lock contained therein must first be dialed to the proper combinations to release and permit a slideable panel, positioned within the card, to be moved. Once this panel or slide is unlocked and moved to the proper position, the word "valid," or some other like symbol, appears in a window provided in the face of the card and the card is then, and only then, properly validated and placed in condition for its intended use.

A card of this improved type, as aforesaid, will thus be of no value whatever to anyone other than the true and proper owner or holder thereof. The combination lock forming an integral part of the card must be unlocked by one having knowledge of the combination. Only then can the slideable panel be released and the panel thus subjected to movement. It is this panel or slide, having visible symbols or words thereon, which indicates to the viewer, when properly positioned, that the card is in the possession of its rightful owner or holder and hence valid for the use for which it is presented. Furthermore, the locking means cannot be forced, for to do so will so damage the component parts of the assembly as to render the entire unit useless, such damage being readily apparent upon the face of the card to anyone to whom it is presented for honoring.

It is, therefore, a primary object of this invention to provide an improved carrying card which serves to identify or symbolize the credit rating of only the true owner thereof and which is of no value to anyone other than the proper owner or holder thereof.

It is an additional objective of this invention to provide an improved carrying card having a locking device incorporated therein which must be first unlocked before the card is validated and in condition for use.

Another object of the invention is to provide a card (such as a credit card) having a small and compact combination lock formed therein which must be first dialed to the correct combination to be unlocked before the face of the card can signify that the card is valid and in the possession of the rightful holder or owner thereof.

A further objective of the invention is to provide an improved form of credit card with a sliding panel or pane and a locking device therefor adapted to maintain the panel in an immoveable position within the card enclosure until the operator releases the lock for such panel in order to slide the latter outwardly to validate the card.

Further objects and advantages of our invention will become apparent from the following description, made with reference to the accompanying drawing wherein like numerals indicate like parts, and wherein.

Figure 1:
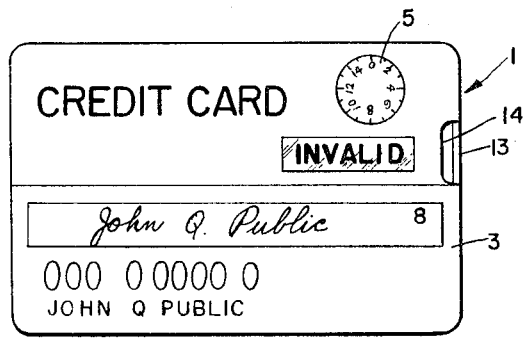
FIGURE 1 is a front view of the credit card as constructed in accordance with this invention and when in an invalid condition.
Figure 2:
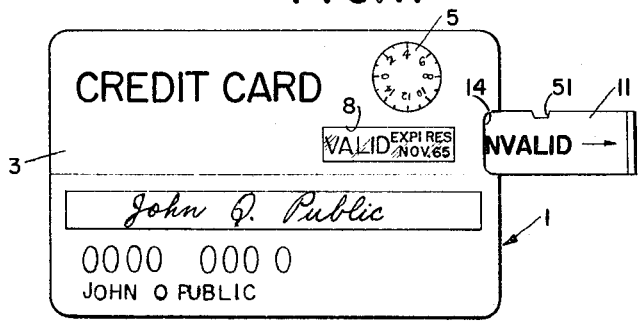
FIGURE 2 is another front view of the credit card of FIGURE 1, but depicting the card in an unlocked and validated condition.

The improved credit card as particularly described and disclosed herein is indicated generally at 1 (FIGURE 1). It includes a sheath generally indicated at 3, a combination lock formed or attached thereto, as at 5, and a transparent window portion 8 formed in the face of the sheath through which information written on slideable panel member 11 may be viewed. This, as well as the other elements making up the improved credit card of this invention, may be constructed of metal, celluloid, methacrylate, epoxy, or any other synthetic resinous material which is readily formable into the elements described herein.

A lip or finger grip 13 is provided on the sliding panel which the operator may grasp to pull the pane outwardly and into a position such that the word valid, or some other like symbol of similar meaning, appears and registers directly under the window section. A cutout portion 14 also facilitates this operation. The sheath itself may be of the form or shape shown herein, or of any other similar shape such as triangular, square, etc. It is necessary only that it accommodate a slideable member within its confines in a manner as set forth hereinafter.

Figure 6:
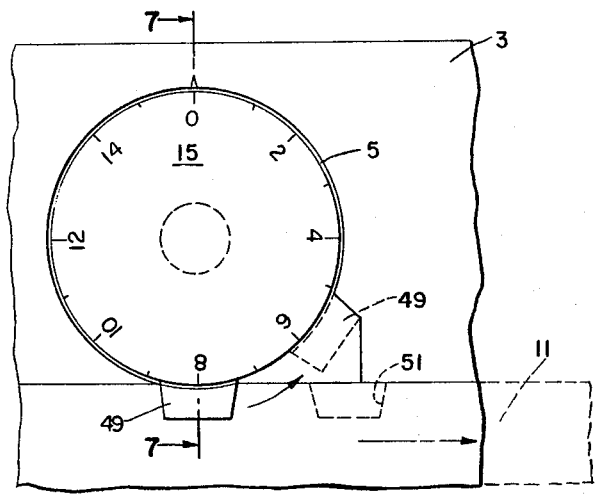
FIGURE 6 is a fragmentary and enlarged front view of the combination lock contained on the face of the card and particularly illustrating the rectangular projection or tooth extending from the lock which is adapted to engage the moveable panel.
Figure 7:
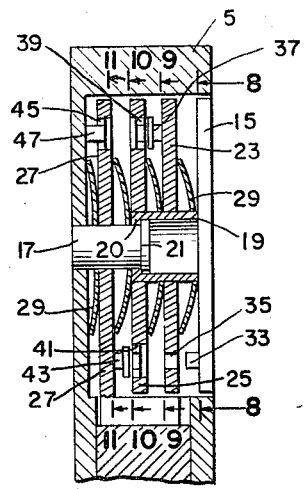
FIGURE 7 is a partial cross-sectional view taken on line 7—7 of FIGURE 6 through the center of the combination locking mechanism to illustrate the relative position and arrangement of the elements therein.
Figure 8:
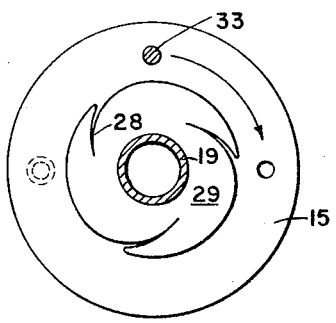
FIGURE 8 is a sectional view taken on line 8—8 of FIGURE 7, showing the inner face of the combination lock and circular spring attached thereto.
Figure 10:
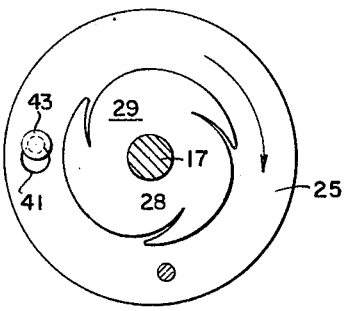
FIGURE 10 is a sectional view taken on line 10—10 of FIGURE 7 through the combination lock showing the disc tumblers, one of which has a projection thereon which connects it in locking engagement with the slideable panel.

To prevent this card from being used by unauthorized persons, a combination lock is built into the card as shown in the enlarged details of FIGURES 6 and 7.

An outer disc member 15 is provided with position indicating numerals thereon. This must be first dialed to the correct combination sequence in order to effect the release of the innermost disc 27 for movement.

The inner rotatable discs and springs making up the lock are free to rotate about either shaft 17, which is formed as a part of the sheath (as in the case with disc 27), or else shaft 19, which is integral with and forms a part of the outer dial 15. There is provided a flange 21, or connected circular disc, on or integral with the shaft 17 thereby to permit shaft 19 to rotate on and about shaft 17 while maintaining the two in locking engagement. Shaft 19 is provided with a complementary interlocking collar 20 for this purpose.

Lying inwardly of the outer disc 15 is disc 23, and below it lies disc 25. Spaced between and attached to each of these rotatable discs is a disc spring, as indicated at 29. These four individual discs are all of the same configuration, and with their respective concave-convex, circular springs (also the same in each instance) are shown individually in FIGURES 8 to 11. The latter illustrate in detail the particular type and position of both the pins and slots for receiving the pins which are formed as a part of these discs.

Each of the circular springs is provided with a series of three curved slots 28, as is usual in such cases, to more readily permit deflection upon depression, i.e., to afford a true spring action.

Figure 9:
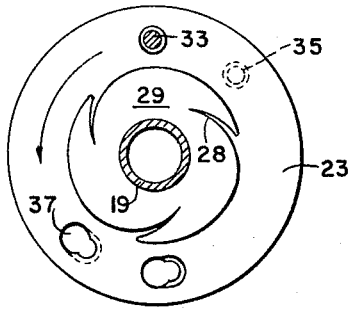
FIGURE 9 is a sectional view taken on line 9—9 through the interior of the combination lock and illustrating one of the circular disc tumblers and attached spring.
Figure 11:
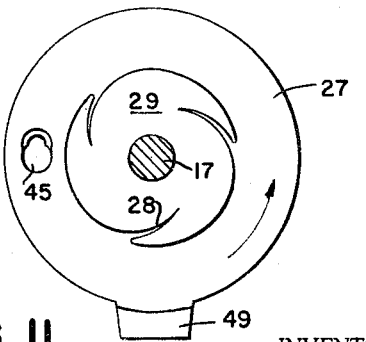
FIGURE 11 is a view similar to FIGURE 10 and a cross-section taken on the line 11—11 of FIGURE 7.

The outer dial 15 has a pin 33 which projects inwardly and is in direct alignment with a circular aperture or recess 39 of the same dimensions formed in disc 23 when the dial is turned to numeral 4. Spaced apart from aperture 35 on the inner side of disc 23 is a T-shaped pin 37. The complementary recess 39 formed in disc 25 is sized to receive T-pin 37 in disc 23 as shown in FIGURES 7 and 9.

Another similar slot or recess 41 is provided at another position on the circumference of disc 25 to receive T-pin 43 projecting from disc 27 (FIGURE 10), and a like T-slot 45 is cut into the opposite and inner face of disc 27 to receive T-pin 47, which is formed as a part of the sheath.

Figure 3:
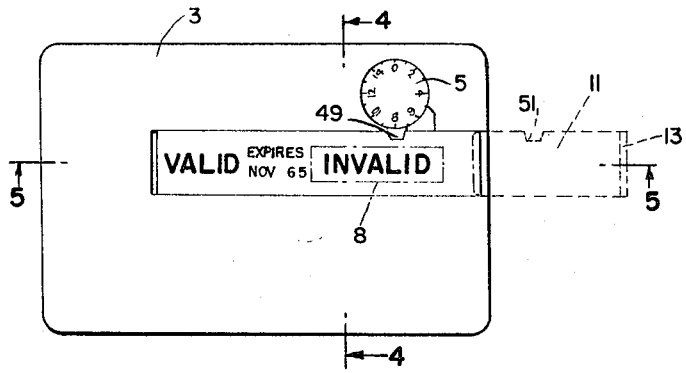
FIGURE 3 is a similar front view of an identification card and lock assembly incorporated therein, and particularly illustrating, in dotted line, the position of the sliding pane when placed in a valid position.
Figure 4:
FIGURE 4 is an enlarged cross sectional view taken on the line 4—4 of FIGURE 3, through the slideable panel, card sheath, and transparent window therein and showing the relative positioning of these elements with respect to each other.
Figure 5:
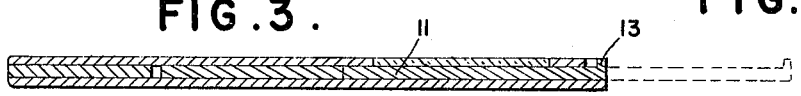
FIGURE 5 is an enlarged cross section taken on the line 5—5 of FIGURE 3 through the card sheath and slideable pane, and especially serving to illustrate the position of the panel when in an extended position and further showing the lip formed on the end thereof.

Projecting radially from the periphery of disc 27 is tooth 49 (FIGURES 3, 6 and 11) which is designed to fit into and engage a corresponding notch 51 formed in panel 11. It is this tooth 49 which is fixed immovably until the lock is opened and which exerts the restraining and locking action on the slideable panel.

In order to open the combination lock 5, the outer dial 15 is turned to a predetermined position (numeral 4 in this instance) and pressed inwardly against the action of the adjacent spring 29 until pin 23 is inserted into locking engagement with hole 35 in disc 23. While in a depressed condition, the dial is then turned until T-pin 37 is in alignment with T-slot 39 (here position 12) whereupon an additional inward force causes the same to move into locking engagement therewith. Yet another turn in the opposite direction to number 8, accompanied by additional inward pressure, drops T-slot 41 on to T-pin 43 which will then permit disc 27 to be turned. Only a very slight turn is then necessary to move the head of T-pin 47 out of locking engagement with T-pin slot 45 and allow the innermost disc spring 29 to force disc 27 away from the sheath.

Once the disc 27 is no longer in contact with pin 47 and constrained thereby, it is free to rotate about shaft 17 which in turn permits the tooth 49 to be moved in contact with the slide as it is being pulled from the sheath.

It is evident from the foregoing that the combination lock described above and employed herein is not easily opened without the correct combination. Thus, the lock serves to provide a high degree of protection to save the owner thereof against any risk and expense should the card fall into the wrong hands.

It will also be appreciated that there we have provided a device in which the several objects of this invention are achieved and which is well adapted to meet the conditions of the particular use herein outlined.

It is to be understood that the device herein described and shown in the accompanying drawing is to be interpreted as being illustrative only, it being further understood that the scope of the invention is not to be limited except by such limitations or definitions as are present in the claims appended hereto.

We claim:

1. A credit card suitable for use solely and exclusively by the proper holder thereof comprising in combination; a sheath with information thereon to identify the person to whom it was issued, a member disposed within the sheath and slideable therein which contains thereon information relating to the validity of the card, a combination lock formed within the sheath which locks the slideable member in place within the sheath, a transparent window formed in the sheath at a position which will render visible the information on the slideable member when the combination lock is opened and the slideable member is moved to such a position that the information in the window will show that the card is valid.

2. The invention as defined in claim 1 wherein the combination lock contains a rotatable member which acts in locking engagement with a notch formed in the slideable member to restrain and fix it within the sheath until the lock is opened.

3. The invention as defined in claim 2 wherein the information registering in the window when the slideable member is locked within the sheath indicates the credit card is invalid.

4. The invention as defined in claim 1 wherein the combination lock comprises a series of rotatable discs mounted upon aligned shafts, said discs being moveable transversely along the shafts and into locking engagement with one another when the discs are rotated and moved transversely in a predetermined manner, one of said discs having a tooth projecting from the periphery thereof which serves to engage a notch formed in the slideable member thereby to lock said member in a fixed position within the sheath.

References Cited by the Examiner

UNITED STATES PATENTS 1,425,159  8/1922  Zepka _____ 40—65

EUGENE R. CAPOZIO, *Primary Examiner.*

W. J. CONTRERAS, *Assistant Examiner.*